United States Patent
DeWille et al.

(10) Patent No.: US 9,179,702 B2
(45) Date of Patent: Nov. 10, 2015

(54) LIQUID NUTRITIONAL COMPOSITIONS CONTAINING UNSATURATED FATTY ACIDS

(75) Inventors: Normanella T. DeWille, Columbus, OH (US); Allison Ogilvie, Longmont, CO (US); William J. Rodgers, Cranberry Township, PA (US); Douglas J. Wearly, Blacklick, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 2236 days.

(21) Appl. No.: 11/485,709

(22) Filed: Jul. 13, 2006

(65) Prior Publication Data
US 2007/0048405 A1    Mar. 1, 2007

Related U.S. Application Data

(60) Provisional application No. 60/699,017, filed on Jul. 13, 2005.

(51) Int. Cl.
| | |
|---|---|
| A23L 1/30 | (2006.01) |
| A23C 11/04 | (2006.01) |
| A23L 1/222 | (2006.01) |
| A23L 1/305 | (2006.01) |
| A23L 2/52 | (2006.01) |

(52) U.S. Cl.
CPC .............. *A23L 1/3008* (2013.01); *A23C 11/04* (2013.01); *A23L 1/2225* (2013.01); *A23L 1/3056* (2013.01); *A23L 2/52* (2013.01); *A23V 2002/00* (2013.01)

(58) Field of Classification Search
CPC ................... A23V 2002/00; A23V 2250/187; A23V 2250/1868; A23V 2250/1874; A23V 2250/70; A23V 2250/156; A23V 2250/712; A23V 2200/301; A23V 2250/1578; A23V 2250/542461; A23V 2250/54252
USPC ................................... 426/72, 648, 658, 800
See application file for complete search history.

(56) References Cited

U.S. PATENT DOCUMENTS

| | | | |
|---|---|---|---|
| 5,053,387 A | 10/1991 | Alexander | |
| 5,077,069 A | 12/1991 | Chang et al. | |
| 5,230,916 A | 7/1993 | Chang et al. | |
| 5,444,054 A | 8/1995 | Garleb et al. | |
| 5,714,472 A | 2/1998 | Gray et al. | |
| 5,723,446 A * | 3/1998 | Gray et al. | 514/21 |
| 5,780,451 A | 7/1998 | DeMichele et al. | |
| 5,886,037 A * | 3/1999 | Klor et al. | 514/546 |
| 6,326,355 B1 | 12/2001 | Abbruzzese et al. | |
| 6,475,539 B1 | 11/2002 | DeWille et al. | |
| 6,596,302 B2 | 7/2003 | O'Connor et al. | |
| 2002/0044988 A1 | 4/2002 | Fuchs et al. | |
| 2003/0104033 A1 | 6/2003 | Lai et al. | |
| 2004/0161517 A1 * | 8/2004 | Winniczuk | 426/532 |
| 2006/0233915 A1 | 10/2006 | Puski et al. | |
| 2013/0078362 A1 | 3/2013 | DeWille et al. | |

OTHER PUBLICATIONS

Hansen, AP et al, "Decrease of Vanillin Flavor Perception in the Presence of Casein and Whey Proteins," J Dairy Sci, 1991; 74:2936-2940.
St. Angelo, AJ et al, "Studies of Lipid-Protein Interaction in Stored Raw Peanuts and Peanut Flours", J. Agric. Food Chem., 1986; 34: 643-646.
Hu, M et al, "Impact of Whey Protein Emulsifiers on the Oxidative Stability of Salmon Oil-in-Water Emulsions", J. Agric. Food Chem., 2003; 51:1435-1439.
Tong, LM et al, "Mechanisms of the Antioxidant Activity of a High Molecular Weight Fraction of Whey", J. Agric. Food Chem., 2000; 48: 1473-1478.
Hansen, AP et al, "Benzaldehyde, Citral and d-Limonene Flavor Perception in the Presence of Casein and Whey Proteins", J. Dairy Sci. 1992; 75:1211-1215.
Jasinski, E et al, "Flavor Binding by Whey Proteins", Milchwissenschraft, 1985; 40(10):596-599.
Hootman, R., ed., Manual on Descriptive Analysis Testing for Sensory Evaluation, p. 5-14, (1992).
Office Action in U.S. Appl. No. 13/682,410 dated Feb. 28, 2013.
Applicant-initiated interview Summary in U.S. Appl. No. 13/682,410 dated May 31, 2013.
Amendment in U.S. Appl. No. 13/682,410 dated Jul. 15, 2013.
Final Office Action in U.S. Appl. No. 13/682,410 dated Jan. 29, 2014.
Amendment with RCE in U.S. Appl. No. 13/682,410 dated Apr. 29, 2014.
Office Action in U.S. Appl. No. 13/682,410 dated Jul. 1, 2014.
Response to Office Action in U.S. Appl. No. 13/682,410 dated Sep. 30, 2014.
Office Action in U.S. Appl. No. 13/682,410 dated Dec. 24, 2014.
Amendment in U.S. Appl. No. 13/682,410 dated Mar. 23, 2015.
FAO, "Section 2. Codex Standards for Fats and Oils from Vegetable Sources," Feb. 1, 2001, www.fao.orgdocrep004y2774e04.htm, pp. 1-7.
Office Action in U.S. Appl. No. 13/682,410 dated Jun. 11, 2015.

* cited by examiner

*Primary Examiner* — Michele L Jacobson
*Assistant Examiner* — Hong T Yoo
(74) *Attorney, Agent, or Firm* — Calfee, Halter & Griswold LLP

(57) ABSTRACT

Disclosed are liquid nutritional compositions comprising: carbohydrate; lipid having from about 0.1% to about 20% of an n-3 polyunsaturated fatty acid, n-6 polyunsaturated fatty acid, or combinations thereof by weight of the composition; a protein matrix having from about 15% to about 50% of a whey protein fraction by weight of the total protein in the composition; and a limonene-containing material, cranberry oil, or combinations thereof. The compositions are preferably aseptically packaged, and provide enhanced oxidative stability, flavor, and aroma, especially when formulated with relative high polyunsaturated fatty acid concentrations.

24 Claims, No Drawings

LIQUID NUTRITIONAL COMPOSITIONS CONTAINING UNSATURATED FATTY ACIDS

This application claims the benefit of U.S. Provisional Application No. 60/699,017 filed Jul. 13, 2005

The present invention relates to liquid nutritional compositions containing polyunsaturated fatty acids having improved oxidative stability, flavor and aroma.

BACKGROUND OF THE INVENTION

Nutritional formulas today are well known for a variety of nutritional or disease specific applications in infants, children and adults. These formulas most typically contain a balance of proteins, carbohydrates, lipids, vitamins, and minerals tailored to the nutritional needs of the intended user, and include product forms such as ready-to-drink liquids, reconstitutable powders, nutritional bars, and many other forms.

Many nutritional formulas also commonly contain a variety of polyunsaturated fatty acids (PUFA) as part of the lipid component of the overall nutrient system, examples of which include omega-3 (n-3) fatty acids such as alpha-linolenic acid (C18:3n-3), stearidonic acid (C18:4n-3), eicosapentaenoic acid (C20:5n-3), docosapentaenoic acid (C22:5n-3), and docosahexaenoic acid (C22:6n-3), and omega-6 (n-6) fatty acids such as linoleic acid (C18:2n-6), gamma-linolenic acid (C18:3n-6), eicosadienoic acid (C20:2n-6), arachidonic acid (C20:4n-6), and di-homo-gamma-linolenic acid (C20:3n-6). A growing body of evidence now suggest that diets containing sufficient amounts of certain long chain polyunsaturated fatty acids may be beneficial for the maintaining overall health, and may also be helpful for treating or preventing a variety human diseases or afflictions. Certain long chain polyunsaturated fatty acids have been shown to be beneficial in the prevention and/or management of cardiovascular disease, rheumatoid arthritis, depression, Alzheimer's, ulcers, cancer, hyperactivity, asthma, or other diseases or conditions responsive to anti-inflammatory effects.

Arachidonic and docosahexaenoic acids in particular have been shown to provide beneficial effects in preterm infants such as enhanced brain and vision development, and are now commonly found in many commercially available infant formulas such as Similac® Advance® Infant Formula and Isomil® Advance® Infant formula, both of which are available from Ross Products Division, Abbott Laboratories, Columbus, Ohio, USA.

These polyunsaturated fatty acids, however, tend to be more sensitive to oxidation than many other ingredients commonly found in nutritional formulas. Due to their chemical structure, exposure to heat and atmospheric levels of oxygen can cause a series of chemical reactions about their carbon: carbon double bonds resulting in free radical formation. These free radicals can continue to break down the polyunsaturated fatty acids in an auto-oxidative process, which results in the development of undesirable off-flavors and odors and the eventual degradation of the beneficial polyunsaturated fatty acids. These polyunsaturated fatty acids are especially susceptible to oxidation when subjected to elevated temperatures during processing or storage.

Oxidative stability has become especially challenging when formulating a nutritional liquid containing the relatively high concentrations of polyunsaturated fatty acids often needed to obtain a therapeutic response. Allowing even some oxidation in these products often results in a highly objectionable flavor and aroma, the characteristics of which are often described as fishy, eggy, or otherwise having a rancid flavor or smell, depending upon the particular polyunsaturated fatty acid used in the formulation.

Methods of controlling the undesirable oxidation of polyunsaturated fatty acids in a nutritional product include processing or manufacturing controls to limit conditions such as elevated temperatures, exposure to ultraviolet light, exposure to oxygen and other factors that can promote oxidation. All such methods almost always include the concurrent formulation with one or more anti-oxidant additives such as ascorbic acid or ascorbyl palmitate, tocopherols, beta-carotene, or others. Although these methods are often highly effective in reducing much of the undesirable oxidation that would otherwise occur, they are often not as effective when applied to liquid nutritional compositions that contain the relatively high polyunsaturated fatty acid concentrations often needed to achieve a desired therapeutic effect.

It has now been found, however, that liquid nutritionals containing relatively high polyunsaturated fatty acids can now be formulated with improved oxidative stability and flavor masking, without the need to reduce fatty acid concentrations in order to achieve the desired oxidative stability and thus, acceptable flavor. This has been accomplished by preparing the liquid nutritional so as to comprise: (A) a carbohydrate component; (B) a lipid component having from about 0.1% to about 10% of an n-3 fatty acid, n-6 fatty acid, or combinations thereof, by weight of the liquid composition; (C) a protein component having from about 15% to about 50% of a whey protein fraction by weight of the total protein in the liquid composition, and (D) a limonene-containing material, and/or (E) a flavor masking agent comprising one ore more of cranberry oil, peppermint oil, rosemary oil, or ginger oil.

It has also been found that the liquid nutritionals of the present invention can be aseptically packaged for improved oxidative stability, reduction in the development of off-flavors, and extended shelf life at room temperature.

It is therefore an object of the present invention to provide nutritional formulas containing relatively high concentrations of polyunsaturated fatty acids with improved oxidative stability, flavor, and aroma. It is a further object of the present invention to provide such a formulation without the need to reduce polyunsaturated fatty acid concentrations. It is a further object of the present invention to provide such a formulation comprising a defined protein matrix in combination with a limonene-containing material or selected masking agents for enhanced oxidative stability, flavor, and aroma of the finished product.

These and other objects of the present invention are described and shall be apparent from the description as set forth hereinafter.

SUMMARY OF THE INVENTION

The present invention is directed to liquid nutritional compositions comprising fish or other similar oils, and which provide improved oxidative stability, flavor, and aroma. The liquid nutritional compositions comprise (A) a carbohydrate component, (B) a lipid component having from about 0.1% to about 10% of an n-3 polyunsaturated fatty acid, n-6 polyunsaturated fatty acid, or combinations thereof, by weight of the composition, (C) a protein component having from about 15% to about 50% of a whey protein fraction by weight of the total protein in the composition, and (D) and a limonene-containing material.

It has been found that liquid nutritionals containing relatively high concentrations of fish or other similar oils containing polyunsaturated fatty acids can be formulated to provide improved oxidative stability, flavor, aroma, and overall user acceptability or tolerance. It has been found that by selecting a protein matrix comprising from about 15% to about 50% of a whey protein fraction by weight of the total protein, in combination with a limonene-containing material, that the off-flavor and aroma commonly associated with high concentrations of fish or other similar oils can be effectively minimized or avoided. This has been found to be especially effective when the polyunsaturated fatty acid concentration exceeds about 0.5% by weight of the liquid composition.

It has been found that limonene alone does not adequately mask or prevent off-flavor and odor development associated with the relatively high concentrations of polyunsaturated fatty acids in the liquid nutritional compositions of the present invention, unless the limonene is formulated with the selected protein matrix as defined herein. It is not entirely understood why such a combination of a whey protein fraction and limonene is necessary for the desired product benefits described herein.

It has also been found that limonene-containing materials can be added to or substituted with one or more of cranberry oil, peppermint oil, rosemary oil, or ginger oil, although it too is not entirely understood as how it interacts and works with the protein matrix as defined herein to provide the requisite product benefits.

It has also been found that the compositions of the present invention provide improved oxidative stability, flavor, and aroma during prolonged storage, when prepared by aseptic packaging methods. Although the compositions of the present invention can be prepared by more conventional retort sterilization methods, it has been found that aseptic packaging of these formulations results in even better overall product performance.

DETAILED DESCRIPTION OF THE INVENTION

The liquid nutritional compositions of the present invention are directed to nutritional products in liquid form, which comprise as essential elements selected n-3 and/or n-6 fatty acids, a relatively high whey protein faction, and a limonene-containing material. These and other essential or optional elements or limitations of the compositions and methods of the present invention are described in detail hereinafter.

The term "lipid" as used herein, unless otherwise specified, means fats, oils, and combinations thereof.

The terms "cranberry oil", "peppermint oil", "rosemary oil", or "ginger oil" as used herein, unless otherwise specified, includes any solid or liquid material derived or extracted from the corresponding natural material.

The terms "polyunsaturated fatty acid" or "PUFA" as used herein, unless otherwise specified, refer to any polyunsaturated fatty acid or source thereof, including short chain (less than about 6 carbon atoms per chain), medium chain (from about 6 to 18 carbon atoms per chain) and long chain (having at least about 20 carbon atoms per chain) fatty acids having two or more carbon:carbon double bonds, including n-3 (omega-3) and n-6 (omega-6) polyunsaturated fatty acids.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

Any reference to singular characteristics or limitations of the present invention shall include the corresponding plural characteristic or limitation, and vice versa, unless otherwise specified or clearly implied to the contrary by the context in which the reference is made.

Any combination of method or process steps as used herein may be performed in any order, unless otherwise specified or clearly implied to the contrary by the context in which the referenced combination is made.

The compositions of the present invention may comprise, consist of, or consist essentially of the essential elements and limitations of the invention described herein, as well as any additional or optional ingredients, components, or limitations described herein or otherwise useful in a nutritional or pharmaceutical application.

Polyunsaturated Fatty Acids

The liquid nutritional compositions of the present invention comprise a source of polyunsaturated fatty acids as part of a lipid component of the composition, wherein the polyunsaturated fatty acids comprise n-3 fatty acids, n-6 fatty acids, or combinations thereof. The source of polyunsaturated fatty acid can be any known or otherwise suitable source that is safe and effective for oral administration and is compatible with the essential and other ingredients in the selected product formulation.

The source of polyunsaturated fatty acids for use in the compositions of the present invention include free fatty acids as well as fatty acid esters such as triglycerides, diglycerides, monoglycerides, ethyl esters, and so forth, including various concentrated forms thereof as well as those in structured lipid form.

Polyunsaturated fatty acid concentrations in the liquid nutritionals will vary depending upon many different factors such as the particular fatty acid selected, product form (e.g., sole source or supplemental nutrition), targeted user population (e.g., infants, children, diabetics, healthy adults), and the desired therapeutic outcome for the liquid nutrition (e.g., asthma care, cardiovascular health, infant nutrition, women's health).

Generally, however, such concentrations can represent a relatively high percentage of the finished product at up to about 20% by weight of the composition, including from about 0.2% to about 15%, including from about 0.5% to about 10%, including from about 1.0% to about 9%, including from about 2% to about 8%, including from about 3% to about 6%, and also including from about 3.5% to about 5%, all by weight of the composition.

The polyunsaturated fatty acids suitable for use herein comprise n-3 fatty acids, n-6 fatty acids, or combinations thereof. The n-3 fatty acids are preferred for use in the liquid nutritional compositions, non-limiting examples of which include alpha-linolenic acid (ALA, C18:3n-3), stearidonic acid (C18:4n-3), eicosapentaenoic acid (EPA, C20:5n-3), docosapentaenoic acid (C22:5n-3), docosahexaenoic acid (DHA, C22:6n-3), and combinations thereof. Preferred are docosahexaenoic acid, eicosapentaenoic acid, or combinations thereof.

Preferred sources of n-3 fatty acids for use herein include flax seed oil, canola oil, transgenic oils, and fish oil. Non-limiting examples of fish oil sources include saltwater or cold fresh water fish, non-limiting examples of which include albacore, black bass, bluefish, carp, menhaden oil, anchovy oil, pilchard oil, channel catfish, herring, lake herring, sardines, lake trout, mackerel, pompano, salmon, tuna, and white fish.

Other polyunsaturated fatty acids suitable for use herein include the n-6 polyunsaturated fatty acids, non-limiting examples of which include linoleic acid (C18:2n-6), gamma-linolenic acid (GLA, C18:3n-6), eicosadienoic acid (C20:2n-6), arachidonic acid (ARA, C20:4n-6), di-homo-gamma-linolenic acid (DGLA, C20:3n-6), and combinations thereof. Non-limiting examples of suitable n-6 fatty acid sources for use herein include evening primrose oil, borage oil, black currant seed oil, flaxseed oil, transgenic sources, purified fatty acid sources, and combinations thereof.

The lipid component of the liquid nutritional composition may further comprise, in addition to the essential polyunsaturated fatty acid components as described above, any other lipid nutrient suitable for use in an oral nutritional product, non-limiting examples of which include coconut oil, fractionated coconut oil, soy oil, corn oil, olive oil, safflower oil, high oleic safflower oil, MCT oil (medium chain triglycerides), sunflower oil, high oleic sunflower oil, palm and palm kernel oils, palm olein, canola oil, other marine oils, cottonseed oils, and combinations thereof.

Whey Protein

The liquid nutritional compositions of the present invention comprise a protein matrix or component, wherein the protein includes a whey protein fraction that represents from about 15% to about 50% by weight of the total protein in the composition. The source of protein for use herein, including the whey protein fraction, may include any known or otherwise suitable source that is safe and effective for oral administration and is compatible with the essential and other ingredients in the selected product formulation.

The protein matrix or component of the composition represents the total protein content in the formulation, concentrations of which most typically range from about 1.0% to about 40% by weight of the composition, including from about 5% to about 38%, also including from about 10% to about 37%, and also including from about 15% to about 30%, and also including from about 18% to about 26%, all by weight of the composition.

It is essential, however, that the protein matrix also comprise a whey protein fraction that represents from about 15% to about 50%, including from about 22% to about 45%, and also including from about 25% to about 40%, and also including from about 30% to about 38%, all by weight of the total protein content. It has been found that this particular matrix as defined by a whey protein fraction provides the liquid nutritional composition with enhanced oxidative stability and improved flavor and aroma characteristics, especially during prolonged storage of the composition after manufacturing and packaging, provided that the defined protein matrix is used in combination with the limonene-containing material as described hereinafter, or in combination with the other selected masking agents as described hereinafter.

As background, cows milk comprises a protein component, which is typically about 80% casein protein and about 20% whey protein. The whey protein fraction, which is also an essential element of the liquid nutritional composition of the present invention, in turn most typically comprises at least about several different protein sub-fractions, including beta-lactoglobulin (50-55%), alpha-lactalbumin (20-25%), immunoglobulins (10-15%), bovine serum albumin (5-10%), glycomacropeptide, lactoferrin (1-2%), lactoperoxidase (up to 0.5%), and lysozyme (less than 0.1%).

The whey protein fraction for use in the liquid nutritional composition includes whey protein concentrates, whey protein isolates, hydrolyzed whey protein, and combinations thereof, all of which are derived from the whey protein fraction of cows milk. The protein matrix or component of the present invention, in addition to the whey protein fraction as described above, may comprise any other hydrolyzed, partially hydrolyzed or non-hydrolyzed proteins or protein sources, any of which can be derived from known or otherwise suitable sources such as milk (e.g., casein, milk protein isolate, milk protein concentrate), animal (e.g., meat, fish), cereal (e.g., rice, corn), vegetable (e.g., soy), or combinations thereof. These proteins may also include any free amino acids known for use in nutritional products, non-limiting examples of which include tryptophan, glutamine, tyrosine, methionine, cysteine, arginine, and combinations thereof.

Limonene

Liquid nutritional compositions of the present invention comprise a limonene-containing material. The limonene-containing material for use herein may include any known or otherwise suitable source of limonene, natural or otherwise, that is safe and effective for oral administration and is compatible with the essential and other ingredients in the selected product formulation.

Other names for limonene include 1-methyl-4-(1-methylethenyl)cyclohexene; 4-(1-methylethenyl)-1-methyl-cyclohexene; 4-Isopropenyl-1-methyl-1-cyclohexene; Acintene DP dipentene; Cajeputene; Ciene; Cinene; Cyclil decene; Cyclohexene, 4-Isopropenyl-1-methyl-; Dipenten; Dipentene, mixt. of limonene, 56-64%, and terpinolene, 20-25%; DL-Limonene; DL-p-mentha-1,8-diene; Eulimen; Mentha-1,8-diene; Mentha-1,8-diene, DL; Menthadiene; Methyl-4-(1-methylethenyl)cyclohexene; Methyl-4-isopropenyl-1-cyclohexene; Methyl-4-isopropenylcyclohexene; Monocyclic terpene hydrocarbons; Nesol; p-Mentha-1,8-diene; and terpodiene Limonene is an optically active terpene, closely related to isoprene. It occurs naturally in both the d- and l-forms and can be found in over 300 different varieties of plants, most notable of which include those plants bearing citrus fruits such as lemon, bergamot, caraway, orange, grapefruit, and others. Limonene is commonly concentrated in and subsequently extracted from citrus rinds. D-limonene has a characteristic piney or terpentine aroma, while L-limonene has a more pleasurable orange or citrus aroma.

The liquid nutritional compositions comprise a limonene-containing material, preferably one containing L-limonene. The compositions preferably contain at least about 25 ppm by weight of limonene, more preferably from about 25 ppm to about 1000 ppm, including from about 300 ppm to about 900 ppm, and also including from about 450 ppm to about 850 ppm, and also including from about 500 ppm to about 750 ppm, limonene by weight of the composition. The limonene-containing material is preferably a citrus or citrus peel oil, more preferably orange or orange peel.

It has been found that limonene alone does not adequately mask or prevent off-flavor and odor development associated with the relatively high concentrations of polyunsaturated fatty acids in the liquid nutritional compositions of the present invention, unless the limonene is formulated with the selected protein matrix as defined herein. It is not entirely understood why such a combination of a whey protein fraction and limonene is necessary for the desired product benefits described herein.

It has also been found that limonene-containing materials can be added to or substituted with one or more of cranberry oil, peppermint oil, rosemary oil, or ginger oil, although it too is not entirely understood as how it interacts and works with the protein matrix as defined herein to provide the requisite product benefits.

Carbohydrate

The liquid nutritional compositions of the present invention comprise a carbohydrate component. The carbohydrate component for use herein may include any known or otherwise suitable carbohydrate source that is safe and effective for oral administration and is compatible with the essential and other ingredients in the selected product formulation.

The carbohydrate concentration in the liquid nutritional composition is not critical for purposes of the present invention, but most typically ranges from about 1% to about 75%, including from about 10% to about 65%, also including from about 20% to about 60%, also including from about 35% to about 55%, of the total calories in the composition. It is understood, however, that more or lesser amounts are also possible and are therefore embodied by the breadth of the present invention.

Carbohydrates suitable for use in the liquid nutritional products may be simple, complex, or variations or combinations thereof, non-limiting examples of which include hydrolyzed or modified starch or cornstarch, maltodextrin, glucose polymers, sucrose, corn syrup, corn syrup solids, rice-derived carbohydrate, glucose, fructose, lactose, high fructose corn syrup, indigestible oligosaccharides (e.g., fructooligosaccharides), honey, sugar alcohols (e.g., maltitol, erythritol, sorbitol), and combinations thereof.

The carbohydrates suitable for use herein may also include soluble dietary fiber, non-limiting examples of which include gum arabic, sodium carboxymethyl cellulose, guar gum, citrus pectin, low and high methoxy pectin, oat and barley glucans, carrageenan, psyllium and combinations thereof. Non-soluble dietary fiber is also suitable as a carbohydrate source herein, non-limiting examples of which include oat hull fiber, pea hull fiber, soy hull fiber, soy cotyledon fiber, sugar beet fiber, cellulose, corn bran, and combinations thereof.

The relative amounts of total carbohydrate, lipid and protein in the nutritional liquid compositions can therefore vary considerably depending upon a number of factors, including the targeted dietary needs of the intended user. These macronutrients, however, are most typically formulated within the relative ranges described in the following table.

| | Nutritional Liquid - Macronutrient Ranges | | | | |
|---|---|---|---|---|---|
| Macronutrient | A | B | C | D | E |
| Carbohydrate % total calories | 1–100 | 5–70 | 20–65 | 25–60 | 30–50 |
| Lipid % total calories | 1–100 | 10–85 | 20–65 | 35–60 | 40–55 |
| Protein % total calories | 1–100 | 5–70 | 10–60 | 20–50 | 25–40 |

\* Each numerical value is preceded by the term "about"

Optional Ingredients

The liquid nutritional compositions of the present invention may further comprise other optional components that may modify the physical, chemical, aesthetic or processing characteristics of the products or serve as pharmaceutical or additional nutritional components when used in the targeted population. Many such optional ingredients are known or otherwise suitable for use in other nutritional products and may also be used in the compositions herein, provided that such optional ingredients are safe and effective for oral administration and are compatible with the essential and other ingredients in the selected product form.

Non-limiting examples of such optional ingredients include preservatives, antioxidants, emulsifying agents, buffers, pharmaceutical actives, additional nutrients as described herein, sweeteners including artificial sweeteners (e.g., saccharine, aspartame, acesulfame K, sucralose) colorants, flavors, thickening agents and stabilizers, emulsifying agents, and so forth.

The liquid nutritional compositions of the present invention may further comprise any of a variety of other vitamins or related nutrients, non-limiting examples of which include vitamin A, vitamin D, vitamin E, vitamin K, thiamine, riboflavin, pyridoxine, vitamin $B_{12}$, carotenoids (e.g., beta-carotene, zeaxanthin, lutein, lycopene), niacin, folic acid, pantothenic acid, biotin, vitamin C, choline, inositol, salts and derivatives thereof, and combinations thereof.

The liquid nutritional compositions may further comprise any of a variety of other additional minerals, non-limiting examples of which include calcium, phosphorus, magnesium, iron, zinc, manganese, copper, sodium, potassium, molybdenum, chromium, chloride, and combinations thereof.

The compositions are, however, preferably substantially free of unbound iron, more preferably free of any all iron forms, bound or unbound. In this context, the term "substantially free" means that the composition preferably contains less than 1 mg of iron per 100 ml of the liquid composition, more preferably less than 0.1 mg of iron, even more preferably zero mg of iron, per 100 ml of the liquid composition.

Preferred optional ingredients include any known or otherwise effective antioxidant suitable for use in an oral nutritional composition, non-limiting examples of which include ascorbic acid, ascorbyl palmitate, tocopherols (including alpha, beta, gamma, delta, or mixed tocopherols), carotenoids (including beta-carotene, zeaxanthin, lutein, lycopene) and combinations thereof.

Manufacture

The liquid nutritional compositions of the present invention may be prepared by any known or otherwise effective manufacturing technique for preparing a liquid nutritional. Many such techniques are known in the nutrition and formulation arts and can easily be applied by one of ordinary skill in the art to the liquid nutritional compositions described herein.

Generally, and most typically, a liquid nutritional is prepared by first forming an oil and fiber (if any) blend containing all formulation oils, any emulsifier, fiber, antioxidants, masking agents (e.g., orange oil, cranberry oil) and fat-soluble vitamins. Additional slurries (typically a carbohydrate slurry and at least one protein slurry) are prepared separately by mixing the carbohydrate and minerals together and the protein in water. The slurries are then mixed together with the oil blend. The resulting mixture is homogenized, heat processed, standardized with any water-soluble vitamins, flavored and the liquid terminally sterilized or aseptically processed and filled.

The liquid nutritional compositions of the present invention may, of course, be manufactured by other known or otherwise suitable techniques not specifically described herein without departing from the spirit and scope of the present invention. The present embodiments are, therefore, to be considered in all respects as illustrative and not restrictive and that all changes and equivalents also come within the description of the present invention. The following non-limiting examples will further illustrate the compositions and methods of the present invention.

EXAMPLES

The following examples illustrate specific embodiments of the nutritional compositions and methods of the present invention, including some suitable techniques to prepare the compositions. The examples are given solely for the purpose of illustration and are not to be construed as limitations of the present invention, as many variations thereof are possible without departing from the spirit and scope of the invention.

Examples 1-4 illustrate nutritional liquid embodiments of the present invention. The ingredients for each exemplified composition are described in the following tables. All ingredient amounts are listed as kg per 1000 kg batch of product, unless otherwise specified.

EXAMPLE 1

Ingredient Listing - Liquid Nutritional

| Ingredient | kg per 1000 kg |
|---|---|
| Water | Q.S. |
| Sucrose | 60.9 |
| High oleic safflower oil | 39.8 |
| Milk protein isolate | 33.4 |
| Acid casein | 9.44 |
| Magnesium phosphate dibasic | 6.74 |
| Whey protein concentrate | 5.28 |
| Micronized-tri calcium phosphate | 4.27 |
| Avicel | 4.00 |
| Lemon cream | 4.00 |
| Sodium chloride | 2.11 |
| Soy lecithin | 1.66 |
| Potassium citrate | 1.63 |
| Sodium citrate | 1.05 |
| Lemon oil | 0.500 |
| Carrageenan - Viscarin SD-389 | 0.400 |
| Sensient Tumeric Concentrate #3285 | 0.200 |
| Sodium Hydroxide | 0.196 |
| Liquid Sucralose | 0.175 |
| Ascorbyl palmitate | 0.0498 |
| Acesulfame potassium | 0.0350 |
| Pyridoxine hydrochloride ($B_6$) | 0.0299 |
| Tocopherol-2 antioxidant | 0.00830 |
| Folic Acid | 0.00500 |
| Vitamin $D_3$ | 0.00300 |
| Cyanocobalamin | 0.000337 |
| Vitamin K | 0.000214 |

EXAMPLE 2

Ingredient Listing - Liquid Nutritional

| Ingredient | kg per 1000 kg |
|---|---|
| Ingredient water | Q.S. |
| Borage oil | 61.1 |
| Marine oil | 53.4 |
| Milk protein isolate | 30.4 |
| Sucrose | 11.7 |
| Whey protein concentrate | 8.41 |
| Gum arabic | 8.00 |
| Soy lecithin | 4.77 |
| Cellulose gum | 4.00 |
| Potassium citrate | 2.64 |
| Orange Cream Flavor | 2.50 |
| Ascorbic acid | 1.13 |
| Turmeric powder | 1.00 |

EXAMPLE 2-continued

Ingredient Listing - Liquid Nutritional

| Ingredient | kg per 1000 kg |
|---|---|
| Sodium citrate | 0.901 |
| Potassium hydroxide 45% solution | 0.799 |
| Orange Oil | 0.750 |
| Natural Vitamin E | 0.645 |
| Micronized tri calcium phosphate | 0.631 |
| Tocopherol-2 antioxidant | 0.600 |
| Taurine | 0.456 |
| Vanilla | 0.400 |
| Liquid Sucralose 25% solution | 0.375 |
| Zinc Sulfate | 0.251 |
| Ascorbyl palmitate | 0.143 |
| Sodium chloride | 0.143 |
| Acesulfame potassium | 0.0750 |
| Cupric sulfate | 0.0177 |
| FD&C Red #3 | 0.0150 |
| Beta carotene (30%) | 0.00992 |
| Vitamin A palmitate | 0.00315 |
| Sodium molybdate | 0.000529 |
| Sodium selenate | 0.000441 |

EXAMPLES 3

Ingredient Listing - Liquid Nutritional

| Ingredient | kg per 1000 kg |
|---|---|
| Water | QS |
| Sucrose | 57.6 |
| Milk protein isolate | 34.3 |
| Marine oil (50% omega-3 sardine oil) | 23.5 |
| Whey protein concentrate | 14.0 |
| High DHA tuna oil | 10.1 |
| Potassium citrate | 3.52 |
| Sodium citrate | 3.52 |
| Soy lecithin | 1.11 |
| Flavor | 1.6 |
| Acesulfame Potassium | 0.200 |
| Liquid Sucralose 25% solution | 0.100 |
| Ascorbyl palmitate | 0.0416 |
| Tocopherol-2 antioxidant | 0.00694 |

EXAMPLE 4

Ingredient Listing - Liquid Nutritional

| Ingredient | kg per 1000 kg |
|---|---|
| Water | QS |
| Corn maltodextrin | 118.18 |
| Sodium caseinate | 34.19 |
| Milk protein isolate | 31.37 |
| Sucrose | 26.39 |
| Corn syrup | 16.93 |
| Sardine oil | 15.35 |
| Fructooligosaccharide (FOS) | 13.16 |
| Medium chain triglycerices (fractionated coconut oil) | 5.686 |
| Calcium caseinate | 9.337 |
| Sodium citrate | 3.378 |
| Potassium citrate | 3.372 |
| Canola oil | 3.265 |
| Magnesium chloride | 2.678 |
| Micronized tri-calcium phosphate MTCP | 2.183 |
| Soybean oil | 1.932 |
| Flavor | 1.800 |
| Lecithin | 1.380 |
| Magnesium phosphate dibasic | 0.5860 |
| Choline chloride | 0.5511 |
| Potassium hydroxide 45% solution | 0.2862 |

EXAMPLE 4-continued

Ingredient Listing - Liquid Nutritional

| Ingredient | kg per 1000 kg |
|---|---|
| Ascorbic acid | 0.2650 |
| Taurine | 0.2646 |
| Water soluble premix (WSV Premix) [1] | 0.2510 |
| Potassium chloride | 0.1596 |
| L-Carnitine | 0.1500 |
| UTM/TM Premix [2] | 0.1317 |
| Vitamin D, E, K [3] | 0.0956 |
| Ascorbyl palmitate | 0.064 |
| Carrageenan [4] | 0.0611 |
| Vitamin A palmitate | 0.0165 |
| Tocopherol-2 Antioxidant | 0.011 |
| Potassium iodide | 0.0002 |

[1] Niacinamide, Ca Panthothenate, Folic acid, Thiamine HCL, Riboflavin, Pyridoxine HCL, Cyanocobalamin, Biotin
[2] Chromium, Manganese, Molybdate, Selenium, Zinc
[3] dl-alpha tocopheryl, Phylloquinone, Vitamin D3
[4] Viscarin SA-359, Seakem CM-514

The liquid nutritional compositions of the present invention, including each of the exemplified formulas described above, may be prepared by forming at least three separate slurries, which are then blended together, heat-treated, and standardized. The resulting composition is then flavored, aseptically packaged into plastic bottles or retort sterilized.

The Example 4 composition, for example, can be prepared by first formulating a carbohydrate-mineral slurry by adding an appropriate amount of potassium citrate and UTM/TM Premix to water at 140-160° with high agitation until the added ingredients are completely dissolved, and thereafter add (in order) magnesium chloride, potassium chloride, sodium citrate, potassium iodide, magnesium phosphate, and then MTCP. Allow the resulting slurry to mix under moderate agitation until completely dissolved or dispersed. Then add corn maltodextrin, sucrose, and corn syrup to the mineral slurry with agitation. And then add FOS to the slurry and mix under high agitation until also completely dispersed. The slurry is recirculated to re-disperse any fallout particles. The resulting carbohydrate-mineral slurry is held under moderate agitation at 140-150° F. for a period of time not to exceed 8 hours until later combined with other ingredient during the manufacturing process.

A protein-in-water slurry is then prepared by adding to water at 140° F. in a blend tank calcium caseinate, sodium caseinate and milk protein isolate using a Silverson Mixer in a blend tank. After the ingredients have been added, a powder valve on the tank is closed to reduce foaming. The resulting protein-in-water slurry is agitated for 15 minutes to ensure complete dispersion. The slurry is held under agitation at 130-150° F. for not more than 2.5 hours until later combined with other ingredients during the manufacturing process.

A protein-in-fat slurry is then prepared by adding soy oil, medium chain triglyceride oil, and canola oil to a kettle and heating the combination to 110-120° F. under moderate agitation. The Vitamin DEK premix is then added and completely dispersed with agitation, and thereafter soy lecithin, vitamin A, ascorbyl palmitate, and then Tocopherol-2 antioxidant (in that order) are also added with agitation to the developing slurry. Viscarin SA-359 and Seakem CM514 are then added with agitation until completely dispersed. The resulting protein-in-fat slurry is then maintained with moderate agitation at 110-120° F. and held for not longer than 1 hour before adding to other ingredients during the manufacturing process.

The protein-in-fat slurry is then added to the protein in water slurry. The formed slurry is allowed to mix under moderate agitation for at least 5 minutes before adding to it the carbohydrate-mineral slurry. The resulting blend is allowed to mix under moderate agitation for at least 5 minutes.

The pH of the blend is measured, and if necessary, adjusted to a pH 6.5-6.8 using 1 N KOH solution.

Marine (sardine) oil is then added to the pH-adjusted blend. The blend is subjected to moderate agitation for about 5 minutes. The blend should be processed within 10 minutes of adding the marine oil. The resulting blend is then heated to 160-180° F. using a plate or coil heater. It is then emulsified at 900-1100 psig in a single stage homogenizer and thereafter subjected to Ultra High Temperature (UHT) treatment (pre-heat to 210-230° F., heat mix to 290-297° F. and hold for 5 seconds, cool mix to 210-230° F., and then cool mix further to 150-170° F.). The UHT treated composition is homogenized at 160-170° F. at 3900-4100/400-600 psig. The homogenized blend is then passed through a holding tube and maintained at 160-180° F. for 16 seconds. The resulting blend is cooled, standardized, and stored at 34-45° F. Batch corrections and water addition can then be directed to the cooled formulation.

A vitamin solution is prepared by adding (with agitation) to water at 110-120° F. ascorbic acid, potassium hydroxide solution (45%), choline chloride, taurine, carnitine, and WSV Premix (water soluble vitamin premix). The resulting vitamin solution is maintained under low agitation and held not longer than 1 hour. The vitamin solution is added at the appropriate time to each batch formula.

A flavor solution is also prepared by adding the desired flavor components with agitation to water. Once completely dissolved, the resulting flavor solution is added to each batch at the appropriate time.

All batches are formulated with a pH of from 6.6 to 6.80. Adjustments are made if necessary using a 1 N KOH solution. The resulting manufactured composition is filled in an appropriate container, e.g., 8 oz. cans, and sterilized, or aseptically filled into plastic containers.

The exemplified liquid nutritional compositions of the present invention, including those embodiments described in Examples 1-3, may be prepared by methods or techniques similar to that described above for the nutritional liquid embodiment of Example 4. Each of the exemplified nutritional liquids is administered orally to individuals as a dietary source of omega 3 fatty acids as described herein, including administration in some instances as a sole source of nutrition. Each exemplified liquid formula has improved oxidative stability and flavor, especially during prolonged storage. Each formula, even after prolonged storage of from 12 to 24 months, has minimal or no apparent off-odors or flavors associated with the omega-3 and omega-6 fatty acid components.

Performance Data

Liquid nutritional compositions of the present invention were evaluated for the development of fishy, eggy, and dirty barny off flavors. Tested formulas included the liquid nutritional composition described in Example 2 as well as two variations thereof, one containing only casein protein (no whey protein fraction) and the other containing 44% whey by weight of the total protein. The Example 2 formula itself had about 36% whey protein by weight of the total protein. Each tested formula contained 675 ppm of limonene (from orange oil) in combination with a relatively high concentration of polyunsaturated n-3 and n-6 fatty acid concentrations (each contained about 1.27% EPA, 0.5% DHA, and 1.27% GLA).

As summarized in the table below, the combination of the protein system as defined herein (with a defined whey protein fraction) with a limonene-containing material resulted in less fishy and eggy off flavors from the polyunsaturated fatty acid component. The limonene-containing material was only effective in masking or otherwise minimizing the off-flavors when used in combination with the defined whey protein fraction, and was surprisingly ineffective when used in combination with 100% casein protein, i.e., without the whey protein fraction as defined herein.

| Performance Data Summary | | | |
|---|---|---|---|
| Liquid nutritional compositions* | Fishy off flavor | Eggy off flavor | Dirty Barny off flavor |
| Whey protein fraction: 0% 100% casein protein | ½ | 1 | 1-1½ |
| Whey protein fraction: 36% 80% milk protein isolate 20% whey protein concentrate | 0 | ½-1 | 0 |
| Whey protein fraction: 44% 70% milk protein isolate 30% whey protein concentrate | 0 | ½-1 | 0 |

*based upon the Example 2 formula

What is claimed is:

1. A liquid nutritional composition comprising:
   (A) a carbohydrate component;
   (B) a lipid component having a source of n-3 fatty acid, n-6 fatty acid, or combinations thereof, which represents from about 0.1% to about 10% by weight of the liquid composition;
   (C) a protein component having from about 25% to about 40% of a whey protein fraction by weight of the total protein in the liquid composition; and
   (D) a limonene-containing material.

2. The liquid nutritional composition of claim 1 wherein the whey protein fraction represents from about 30% to about 38% by weight of the total protein.

3. The liquid nutritional composition of claim 1 wherein the composition comprises a source of n-3 fatty acid, n-6 fatty acid, or combinations thereof, which represents from about 0.5% to about 5% by weight of the composition.

4. The liquid nutritional composition of claim 1 wherein the composition comprises as a percentage of total calories in the composition, from about 5% to about 50% of the carbohydrate component, from about 10% to about 85% of the lipid component, and from about 5% to about 40% of the protein component.

5. The liquid nutritional composition of claim 1 wherein the n-3 fatty acid comprises one or more of alpha-linolenic acid, stearidonic acid, eicosapentaenoic acid, docosapentaenoic acid, and docosahexaenoic acid.

6. The liquid nutritional composition of claim 1 wherein the n-3 fatty acid comprises eicosapentaenoic acid and docosahexaenoic acid.

7. The liquid nutritional composition of claim 1 wherein the n-6 fatty acid comprises one or more of linoleic acid, gamma-linolenic acid, eicosadienoic acid, arachidonic acid, and di-homo-gamma-linolenic acid.

8. The liquid nutritional composition of claim 1 wherein the n-6 fatty acid comprises one gamma-linolenic acid.

9. The liquid nutritional composition of claim 1 wherein the composition is aseptically packaged.

10. The liquid nutritional composition of claim 1 wherein the composition comprises from about 3 ppm to about 2000 ppm of limonene by weight of the composition.

11. The liquid nutritional composition of claim 1 wherein the composition comprises from about 20 ppm to about 700 ppm of limonene by weight of the composition.

12. The liquid nutritional composition of claim 1 wherein the limonene-containing material is a citrus fruit-containing material.

13. The liquid nutritional composition of claim 12 wherein the citrus fruit containing material is an orange.

14. A liquid nutritional composition comprising:
   (A) a carbohydrate component;
   (B) a lipid component having a source of n-3 fatty acid, n-6 fatty acid, or combinations thereof, which represents from about 0.1% to about 10% by weight of the liquid composition;
   (C) a protein component having from about 25% to about 40% of a whey protein fraction by weight of the total protein in the liquid composition; and
   (D) flavor masking agent comprising cranberry oil, spearmint oil, rosemary oil, ginger oil, or combinations thereof.

15. The liquid nutritional composition of claim 14 wherein the whey protein fraction represents from about 30% to about 38% by weight of the total protein.

16. The liquid nutritional composition of claim 14 comprising a source of n-3 fatty acid, n-6 fatty acid, or combinations thereof, which represents from about 0.5% to about 5% by weight of the liquid composition.

17. The liquid nutritional composition of claim 14 wherein the composition comprises as a percentage of total calories in the composition, from about 5% to about 50% of the carbohydrate component, from about 10% to about 85% of the lipid component, and from about 5% to about 40% of the protein component.

18. The liquid nutritional composition of claim 14 wherein the n-3 fatty acid comprises one or more of alpha-linolenic acid, stearidonic acid, eicosapentaenoic acid, docosapentaenoic acid, and docosahexaenoic acid.

19. The liquid nutritional composition of claim 14 wherein the n-3 fatty acid comprises eicosapentaenoic acid and docosahexaenoic acid.

20. The liquid nutritional composition of claim 14 wherein the n-6 fatty acid comprises one or more of linoleic acid, gamma-linolenic acid, eicosadienoic acid, arachidonic acid, and di-homo-gamma-linolenic acid.

21. The liquid nutritional composition of claim 14 wherein the n-6 fatty acid comprises one gamma-linolenic acid.

22. The liquid nutritional composition of claim 14 wherein the composition is aseptically packaged.

23. A liquid nutritional composition comprising
   (A) a carbohydrate component which represents from about 5% to about 50% of total calories in the composition;
   (B) a lipid component which represents from about 10% to about 85% of the total calories in the composition and contains a source of n-3 fatty acid, n-6 fatty acid, or combinations thereof, which represents from about 0.5% to about 5% by weight of the liquid composition;
   (C) a protein component which represents from about 5% to about 40% of the total calories in the composition and contains from about 25% to about 40% of a whey protein fraction by weight of the total protein in the liquid composition; and (D) a limonene-containing material which contains from about 3 ppm to about 2000 ppm of limonene by weight of the composition.

24. A liquid nutritional composition comprising
(A) a carbohydrate component which represents from about 5% to about 50% of total calories in the composition;
(B) a lipid component which represents from about 10% to about 85% of the total calories in the composition and contains a source of n-3 fatty acid, n-6 fatty acid, or combinations thereof, which represents from about 0.5% to about 5% by weight of the liquid composition;
(C) a protein component which represents from about 5% to about 40% of the total calories in the composition and contains from about 25% to about 40% of a whey protein fraction by weight of the total protein in the liquid composition; and
(D) flavor masking agent comprising cranberry oil, spearmint oil, rosemary oil, ginger oil, or combinations thereof.

* * * * *